(12) United States Patent
Chen et al.

(10) Patent No.: US 8,971,921 B2
(45) Date of Patent: Mar. 3, 2015

(54) METHOD AND COMPUTER SYSTEM FOR OBTAINING WEIGHTED GEOMETRIC DILUTION OF PRECISION CLOSED FORM

(71) Applicant: NOVATEK Microelectronics Corp., Hsin-Chu (TW)

(72) Inventors: Chien-Sheng Chen, Kaohsiung (TW); Yung-Chuan Lin, Hsinchu (TW); Jium-Ming Lin, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 132 days.

(21) Appl. No.: 13/789,630

(22) Filed: Mar. 7, 2013

(65) Prior Publication Data

US 2014/0141798 A1 May 22, 2014

(30) Foreign Application Priority Data

Nov. 20, 2012 (TW) .............................. 101143245 A

(51) Int. Cl.
*H04W 24/00* (2009.01)
*H04W 4/02* (2009.01)
*G01S 5/00* (2006.01)
*H04W 64/00* (2009.01)

(52) U.S. Cl.
CPC ................ *H04W 4/02* (2013.01); *H04W 64/00* (2013.01); *H04W 4/021* (2013.01); *H04W 4/022* (2013.01); *G01S 5/00* (2013.01)
USPC .................. 455/456.1; 455/456.2; 455/456.3; 455/456.5

(58) Field of Classification Search
USPC ........... 455/456.1, 456.2, 456.3, 456.4, 456.5
See application file for complete search history.

(56) References Cited

U.S. PATENT DOCUMENTS

| | | | |
|---|---|---|---|
| 6,353,744 B1 | 3/2002 | Wu | |
| 6,408,246 B1 | 6/2002 | Fox | |
| 7,236,879 B2 * | 6/2007 | Tsunehara et al. ............. | 701/408 |
| 7,944,395 B1 * | 5/2011 | Curticapean et al. ..... | 342/357.65 |
| 8,325,090 B2 * | 12/2012 | Luo et al. ...................... | 342/451 |
| 2013/0022236 A1 * | 1/2013 | Chang et al. ................... | 382/103 |

* cited by examiner

Primary Examiner — Jean Gelin
(74) Attorney, Agent, or Firm — Winston Hsu; Scott Margo

(57) ABSTRACT

A method utilized in a wireless communication system having a mobile device and a plurality of base stations includes obtaining a geometric matrix according to a plurality of relative distances between the mobile device and the plurality of base stations, obtaining a weighted matrix according to the mobile device and the plurality of base stations, obtaining a weighted geometric dilution of precision according to the weighted matrix and the geometric matrix, so as to obtain a weighted geometric dilution of precision closed form, and choosing a plurality of selected base stations from the plurality of base stations according to the weighted geometric dilution of precision closed form to position the mobile device.

18 Claims, 3 Drawing Sheets

METHOD AND COMPUTER SYSTEM FOR OBTAINING WEIGHTED GEOMETRIC DILUTION OF PRECISION CLOSED FORM

BACKGROUND OF THE INVENTION

1. Field of the Invention

The present invention relates to a method and a computer system for obtaining a weighted geometric dilution of precision (WGDOP) closed form, and more particularly, to a method and a computer system for obtaining a WGDOP closed form via a weighted geometric matrix to position a mobile device.

2. Description of the Prior Art

In the development of wireless communications and the mobile device, the prior art has provided various wireless position algorithms accompanying a computer system for estimating a position of a mobile device, wherein a weighted geometric dilution of precision (WGDOP) closed form has been widely utilized to position the mobile device. However, during a calculating period of the WGDOP closed form, the computer system is necessary to deal with complicated inverse matrix computations such that more hardware resources of the computer system are occupied and a longer computational period is spent as well. If more base stations are inevitable or the mobile device is continuously moving and the computer system has to correspondingly obtain an accurate computation of the mobile device, the WGDOP closed form has the ability to provide a precise estimated position of the mobile device with more inverse matrix computations, which results in a heavy burden of the computer system and limits the application range of the WGDOP closed form utilized in a complex wireless communication system.

SUMMARY OF THE INVENTION

A method and a computer system are disclosed for obtaining a weighted geometric dilution of precision (WGDOP) closed form to position a mobile device.

According to an aspect of the disclosure, a method, which utilized in a wireless communication system comprising a mobile device and a plurality of base stations, comprises obtaining a geometric matrix according to a plurality of relative distances between the mobile device and the plurality of base stations, obtaining a weighted matrix according to the mobile device and the plurality of base stations, obtaining a weighted geometric dilution of precision according to the weighted matrix and the geometric matrix, so as to obtain a weighted geometric dilution of precision closed form, and choosing a plurality of selected base stations from the plurality of base stations according to the weighted geometric dilution of precision closed form to position the mobile device.

According to another aspect of the disclosure, a computer system is provided. The computer system comprises a central processing unit, a detection module coupled to the central processing unit for detecting a plurality of base stations neighboring the computer system, and a storage device coupled to the central processing unit for storing a programming code, and the programming code is utilized to instruct the central processing unit to process a method for a wireless communication system.

According to further another aspect of the disclosure, a method utilized in a wireless communication system comprising a mobile device and a plurality of base stations (i=1~n) is disclosed. The method comprises obtaining a multiplied geometric matrix according to a plurality of relative distances between the mobile device and the plurality of base stations, obtaining a plurality of parameters as P=4+p, Q=4+q, M=4+m, N=4+n, a and c, individually dividing the parameters P, Q, M and N by a plurality of diagonal elements k1-k4 of the multiplied geometric matrix, to correspondingly sum results of the division and then multiply by two, so as to form a numerator value, multiplying a first sum of the parameters P, Q, M and N by two to obtain a product, adding the parameters a and c to the product to obtain a second sum, and subtracting 16 from the second sum to form a denominator value, dividing the numerator value by the denominator value and processing a square root operation to obtain a weighted geometric dilution of precision (WGDOP) closed form, and positioning the mobile device according to the WGDOP closed form.

These and other objectives of the present invention will no doubt become obvious to those of ordinary skill in the art after reading the following detailed description of the preferred embodiment that is illustrated in the various figures and drawings.

DETAILED DESCRIPTION

The specification and the claims of the present invention may use a particular word to indicate an element, which may have diversified names named by distinct manufacturers. The present invention distinguishes the element depending on its function rather than its name. The phrase "comprising" used in the specification and the claims is to mean "is inclusive or open-ended but not exclude additional, un-recited elements or method steps." In addition, the phrase "electrically connected to" or "coupled" is to mean any electrical connection in a direct manner or an indirect manner. Therefore, the description of "a first device electrically connected or coupled to a second device" is to mean that the first device is connected to the second device directly or by means of connecting through other devices or methods in an indirect manner.

Figure 1:
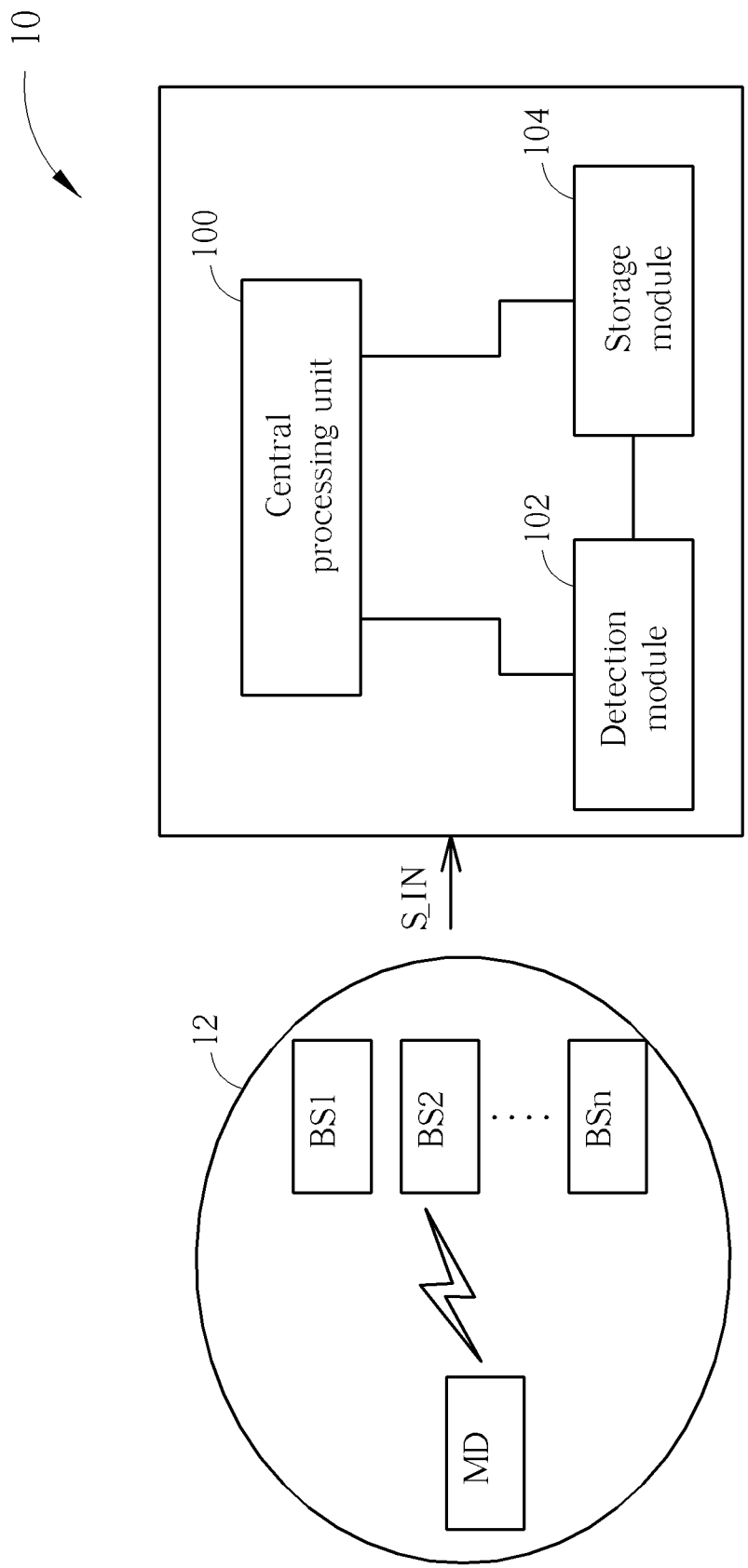
FIG. 1 illustrates a schematic diagram of a computer system according to an embodiment of the invention.

Please refer to FIG. 1, which illustrates a schematic diagram of a computer system 10 according to an embodiment of the invention. The computer system 10 is utilized for a wireless communication system 12, and the wireless communication system 12 comprises a plurality of base stations BS1-BSn and a mobile device MD. As shown in FIG. 1, the computer system 10 comprises a central processing unit 100, a detection module 102 and a storage module 104. The central processing unit 100 is coupled to the detection module 102 and the storage module 104. After the computer system 10 initiates, the detection module 102 correspondingly detects the available plurality of base stations BS1-BSn neighboring the computer system 10 via a control signal (not shown in the figure) of the central processing unit 100, to store information S_IN corresponding to the plurality of base stations BS1-BSn, such as parameters related to relative distances or transmission rates between the plurality of base stations BS1-BSn and the mobile device MD, in the storage device 104, such that the central processing unit 100 can be operated as follows. The storage device 104 further comprises a programming code (not shown in the figure) corresponding to a weighted geometric dilution of precision (WGDOP) process, and the central processing unit 100 process the programming code to obtain a WGDOP closed form corresponding to the WGDOP process, so as to position the mobile device MD.

Under such circumstances, the wireless communication system 12 of the embodiment utilizes the central processing unit 100 for processing the WGDOP process to obtain a simplified WGDOP and a WGDOP closed form thereof, such that the computer system 10 can select a plurality of selected base stations from the wireless communication system 12 to position the mobile device MD. For example, the embodiment selects four base stations BS1-BS4 from the plurality of base stations for positioning. Additionally, the wireless communication system 12 of the embodiment is utilized in a three-dimensional coordinate system comprising the X-axis, the Y-axis, the Z-axis and a plurality of coordinates. Certainly, the wireless communication system 12 of the embodiment is utilized in a two-dimensional coordinate system comprising the X-axis, the Y-axis and a plurality of coordinates. For detailed descriptions, the embodiment of the invention is focused on the wireless communication system 12 in the three-dimensional coordinate system, and the following assumptions of the X-axis, the Y-axis, the Z-axis and the plurality of coordinates are considered. Of course, those skilled in the art can modify/adjust the utilized coordinate system and the coordinates thereof to comply with different requirements, which is also in the scope of the invention.

Figure 2:
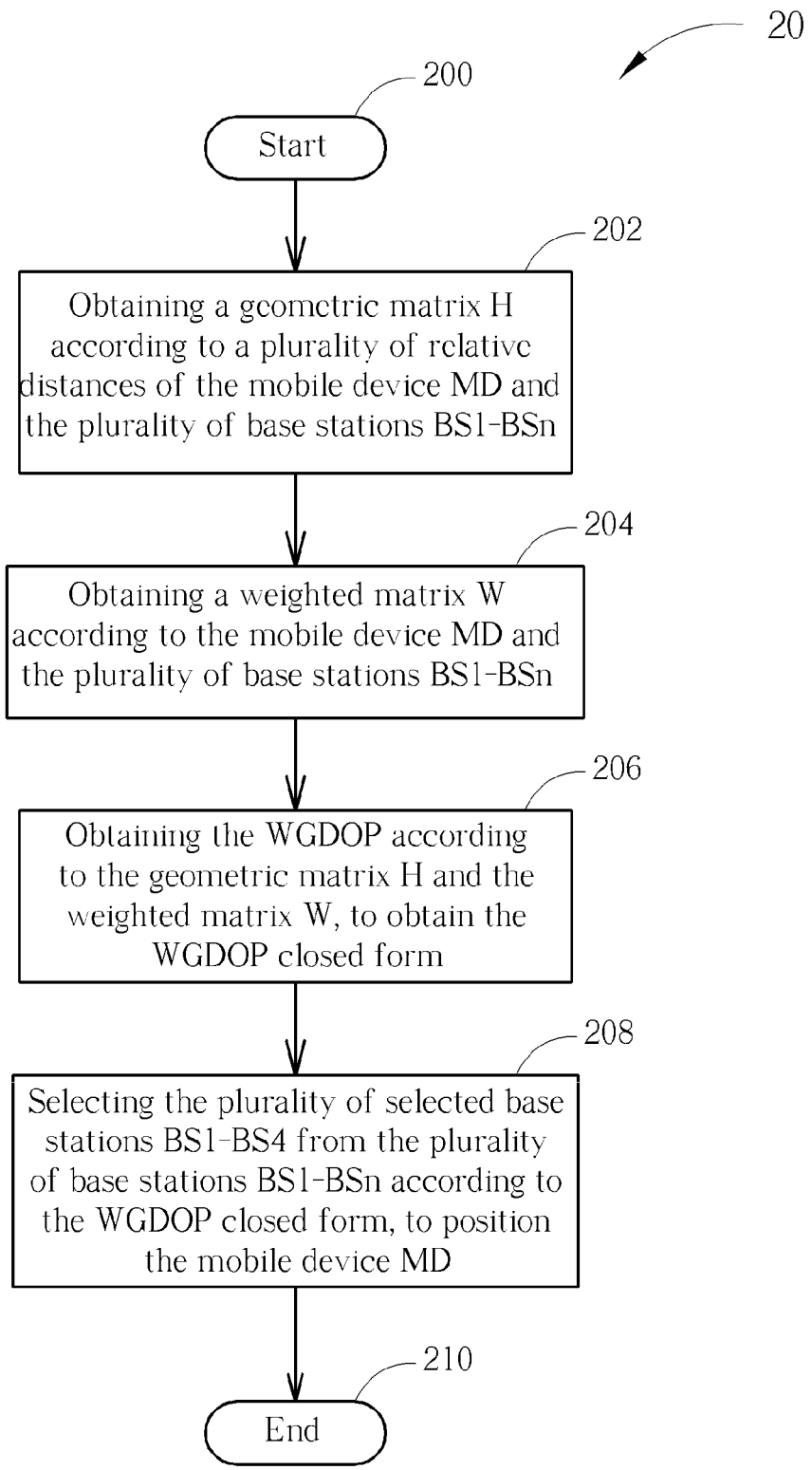
FIG. 2 illustrates a flow chart of a positioning process according to an embodiment of the invention.

Preferably, the computer system 10 processing the WGDOP to obtain the WGDOP closed form for positioning the mobile device MD can be derived into a positioning process 20, as shown in FIG. 2. The positioning process 20 includes the steps as follows:

Step 200: Start.
Step 202: Obtaining a geometric matrix H according to a plurality of relative distances of the mobile device MD and the plurality of base stations BS1-BSn.
Step 204: Obtaining a weighted matrix W according to the mobile device MD and the plurality of base stations BS1-BSn.
Step 206: Obtaining the WGDOP according to the geometric matrix H and the weighted matrix W, to obtain the WGDOP closed form.
Step 208: Selecting the plurality of selected base stations BS1-BS4 from the plurality of base stations BS1-BSn according to the WGDOP closed form, to position the mobile device MD.
Step 210: End.

The positioning process 20 is compiled as the programming code to be stored in the storage device 104, and the central processing unit 100 processes the programming code accordingly. In step 202, the computer system 10 obtains the available base stations BS1-BSn and the information S_IN thereof via the detection module 102, and the related information of the mobile device MD is obtained via the base stations BS1-BSn as well. Thus, the computer system 10 has the relative distances $r_i$ between the mobile device MD and the base stations BS1-BSn, as shown in equation (1):

$$r_i = \sqrt{(x-X_i)^2+(y-Y_i)^2+(z-Z_i)^2}+C \cdot t_b+v_{ri} \quad (1),$$

wherein the coordinate (x,y,z) represents the position of mobile device MD, the coordinate $(X_i,Y_i,Z_i)$ represents the position of the $i_{th}$ base station, C represents the light speed, $t_b$ represents a time offset, and $v_{ri}$ represents a pseudo-range measurements noise. Further, equation (1) can be linearized by taking Taylor series expansion around an approximate mobile device position $(\hat{x},\hat{y},\hat{z})$ and correspondingly neglecting higher order terms, such that equation (2) is obtained:

$$\Delta r_i = r_i - \hat{r}_i \approx e_{i1}\delta_x + e_{i2}\delta_y + e_{i3}\delta_z + C \cdot t_b + v_{ri} \quad (2),$$

wherein $(\delta_x,\delta_y,\delta_z)$ are coordinate offsets of coordinate (x,y,z), respectively, symbols shown in equation (2) are $$e_{i1} = \frac{\hat{x}-X_i}{\hat{r}_i},$$

$$e_{i2} = \frac{\hat{y}-Y_i}{\hat{r}_i},$$

$$e_{i3} = \frac{\hat{z}-Z_i}{\hat{r}_i},$$

and $\hat{r}_i = \sqrt{(\hat{x}-X_i)^2+(\hat{y}-Y_i)^2+(\hat{z}-Z_i)^2}$, and $(e_{i1},e_{i2},e_{i3})$ with i=1, 2, ..., n can represent the LOS vectors between the mobile device and the base stations. Next, applying z=Hδ+v with $$z = \begin{bmatrix} r_1 - \hat{r}_1 \\ r_2 - \hat{r}_2 \\ \vdots \\ r_n - \hat{r}_n \end{bmatrix},$$

$$\delta = \begin{bmatrix} \delta_x \\ \delta_y \\ \delta_z \\ c \cdot t_b \end{bmatrix},$$

$$v = \begin{bmatrix} v_{r1} \\ v_{r2} \\ \vdots \\ v_{rm} \end{bmatrix} \text{ to have } H = \begin{bmatrix} e_{11} & e_{12} & e_{13} & 1 \\ e_{21} & e_{22} & e_{23} & 1 \\ \vdots & \vdots & \vdots & \vdots \\ e_{n1} & e_{n2} & e_{n3} & 1 \end{bmatrix},$$

equation (3) of the GDOP is obtained:

$$GDOP = \sqrt{tr(H^T H)^{-1}} \quad (3).$$

In step 204, considering current positions (circumstance parameters) of the base stations BS1-BSn as well as estimated computational accuracy (individual parameters) of each of the base stations or processing the positioning process 20 in different wireless communication systems, a covariance as $\sigma_i^2$ is obtained while estimating the relative distance $r_i$ between the mobile device MD and the base stations BS1-BSn. Accordingly, every base station has different covariances to obtain the weighted matrix W, as shown in equation (4):

$$W = \begin{bmatrix} 1/\sigma_1^2 & 0 & 0 & 0 & 0 \\ 0 & 1/\sigma_2^2 & 0 & 0 & 0 \\ 0 & 0 & 1/\sigma_3^2 & 0 & 0 \\ 0 & 0 & 0 & \ddots & 0 \\ 0 & 0 & 0 & 0 & 1/\sigma_n^2 \end{bmatrix} = \begin{bmatrix} k_1 & 0 & 0 & 0 & 0 \\ 0 & k_2 & 0 & 0 & 0 \\ 0 & 0 & k_3 & 0 & 0 \\ 0 & 0 & 0 & \ddots & 0 \\ 0 & 0 & 0 & 0 & k_n \end{bmatrix}. \quad (4)$$

In step 206, equation (4) and equation (3) are combined to rewrite the equation for the WGDOP, as shown in equation (5):

$$WGDOP = \sqrt{tr(H^T W H)^{-1}} \quad (5).$$

Under such circumstances, the WGDOP processes a matrix computation operation for the geometric matrix H and the weighted matrix W, and accordingly, the WGDOP closed form is obtained.

In step 208, the computer system 10 selects four selected base stations BS1-BS4 from the base stations BS1-BSn of the wireless communication system 12 to position the mobile device MD. In detail, the computer system 10 utilizes the related information S_IN of the base stations BS1-BSn and the WGDOP closed form to obtain a plurality of computational results, and the computational results corresponding to the base stations BS1-BSn are sorted to select the smallest four values as well as the base stations thereof for positioning the mobile device MD. In comparison with the conventional GDOP closed form, the WGDOP closed form is operated with less complicated computations to lessen computational burdens of the computer system 10. Details of the simplified computational processes can be understood as follows.

Figure 3:
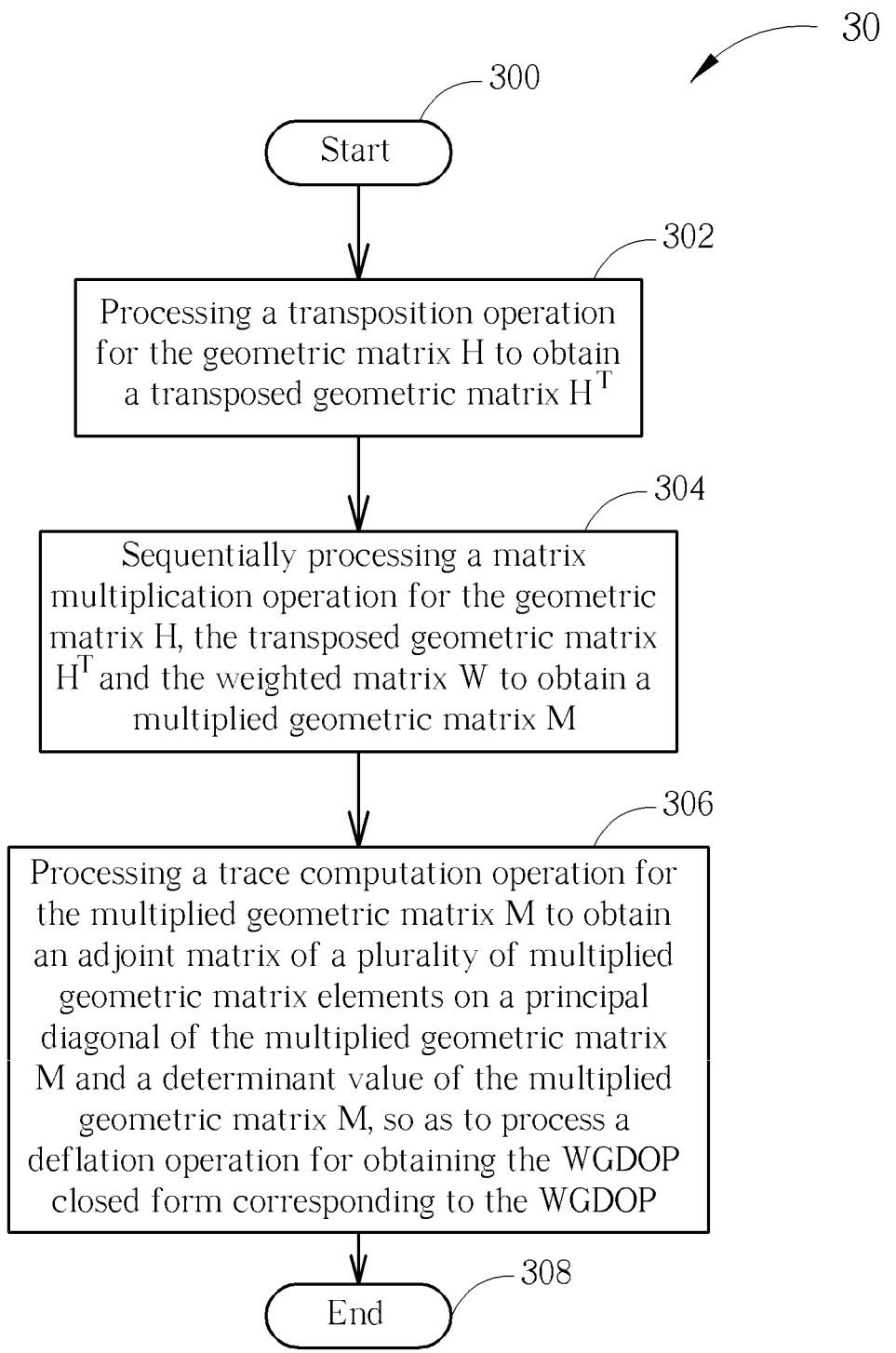
FIG. 3 illustrates a flow chart of a simplification process according to an embodiment of the invention.

In the positioning process 20, step 206 as obtaining the WGDOP according to the geometric matrix H and the weighted matrix W to obtain the WGDOP closed form can also be derived into a simplification process 30, as shown in FIG. 3. The simplification process 30 includes the steps as follows:

Step 300: Start.

Step 302: Processing a transposition operation for the geometric matrix H to obtain a transposed geometric matrix $H^T$.

Step 304: Sequentially processing a matrix multiplication operation for the geometric matrix H, the transposed geometric matrix $H^T$ and the weighted matrix W to obtain a multiplied geometric matrix M.

Step 306: Processing a trace computation operation for the multiplied geometric matrix M to obtain an adjoint matrix of a plurality of multiplied geometric matrix elements on a principal diagonal of the multiplied geometric matrix M and a determinant value of the multiplied geometric matrix M, so as to process a deflation operation for obtaining the WGDOP closed form corresponding to the WGDOP.

Step 308: End.

In step 302, the geometric matrix H is processed via the transposition operation to obtain the transposed geometric matrix $H^T$, and the transposition operation should be well known to those skilled in the art, which means each of the matrix elements of the geometric matrix H is relocated from row to column as well as from column to row, and is not described herein for brevity.

In step 304, the geometric matrix H, the transposed geometric matrix $H^T$ and the weighted matrix W are sequentially processed via the matrix multiplication operation, wherein the matrix multiplication operation is $$HH^T W = \begin{bmatrix} e_{11} & e_{12} & e_{13} & 1 \\ e_{21} & e_{22} & e_{23} & 1 \\ e_{31} & e_{32} & e_{33} & 1 \\ e_{41} & e_{42} & e_{43} & 1 \end{bmatrix} \begin{bmatrix} e_{11} & e_{21} & e_{31} & e_{41} \\ e_{12} & e_{22} & e_{32} & e_{42} \\ e_{13} & e_{23} & e_{33} & e_{43} \\ 1 & 1 & 1 & 1 \end{bmatrix} \begin{bmatrix} k_1 & 0 & 0 & 0 \\ 0 & k_2 & 0 & 0 \\ 0 & 0 & k_3 & 0 \\ 0 & 0 & 0 & k_4 \end{bmatrix}$$

and the multiplied geometric matrix is $$M = \begin{bmatrix} 2k_1 & k_2 B_{12} & k_3 B_{13} & k_4 B_{14} \\ k_1 B_{12} & 2k_2 & k_3 B_{23} & k_4 B_{24} \\ k_1 B_{13} & k_2 B_{23} & 2k_3 & k_4 B_{34} \\ k_1 B_{14} & k_2 B_{24} & k_3 B_{34} & 2k_4 \end{bmatrix}$$

with $B_{ij} = e_{i1}e_{j1} + e_{i2}e_{j2} + e_{i3}e_{j3} + 1$, $1 \leq i < j \leq 4$. Preferably, the embodiment utilizes the matrix computation to rewrite the WGDOP as WGDOP=$\sqrt{tr(H^T W H)^{-1}} = \sqrt{tr(HH^T W)^{-1}} = \sqrt{tr(M)^{-1}}$ before processing step 306, which means that the WGDOP can be rewritten as the multiplication geometric matrix for obtaining a simplified WGDOP as S_WGDOP= $\sqrt{tr(M)^{-1}}$.

In step 306, the multiplied geometric matrix M is processed via the trace computation operation as $$tr(M)^{-1} = \sum_{i=1}^{4} (M)^{-1}_{i,i} = \frac{tr[adj(M)]}{\det(M)} = \sum_{i=1}^{4} \frac{cof_{i,i}(M)}{\det(M)},$$

to simplify the adjoint matrix adj(M) or the cofactor $cof_{i,j}(M)$ of the plurality of multiplied geometric matrix elements on the principal diagonal of the multiplied geometric matrix M and the determinant value det(M) of the multiplied geometric matrix M, so as to process the deflation operation, wherein the cofactor on the $i_{th}$ row and $i_{th}$ column are shown as $cof_{1,1}(HH^T W) = k_2 k_3 k_4 [8 + 2(B_{23}B_{24}B_{34} - (B_{23}^2 + B_{24}^2 + B_{34}^2))]$, $cof_{2,2}(HH^T W) = k_1 k_3 k_4 [8 + 2(B_{13}B_{14}B_{34} - (B_{13}^2 + B_{14}^2 + B_{34}^2))]$, $cof_{3,3}(HH^T W) = k_1 k_2 k_4 [8 + 2(B_{12}B_{14}B_{24} - (B_{12}^2 + B_{14}^2 + B_{24}^2))]$ and $cof_{4,4}(HH^T W) = k_1 k_2 k_3 [8 + 2(B_{12}B_{13}B_{23} - (B_{12}^2 + B_{13}^2 + B_{23}^2))]$, and the determinant value of the multiplied geometric matrix M is $$\det(HH^T W) = \\
k_1 k_2 k_3 k_4 \{16 + 2[B_{23}B_{24}B_{34} - (B_{23}^2 + B_{24}^2 + B_{34}^2)] + 2[B_{13}B_{14}B_{34} - \\
(B_{13}^2 + B_{14}^2 + B_{34}^2)] + 2[B_{12}B_{14}B_{24} - (B_{12}^2 + B_{14}^2 + B_{24}^2)] + \\
2[B_{12}B_{13}B_{23} - (B_{12}^2 + B_{13}^2 + B_{23}^2)] + \\
(B_{12}B_{34} + B_{13}B_{24} - B_{14}B_{23})^2 - 4B_{12}B_{34}B_{13}B_{24} + \\
2[B_{12}(B_{13}B_{23} + B_{14} + B_{24}) + B_{34}(B_{13}B_{14} + B_{23}B_{24})]\}.$$

Accordingly, the simplified WGDOP can be represented with the cofactor on the $i_{th}$ row and $i_{th}$ column after the deflation operation and the determinant value of the multiplied geometric matrix M. Preferably, a plurality of parameters as a, c, p, q, m and n can be obtained as $a = (B_{12}B_{34} + B_{13}B_{24} - B_{14}B_{23})^2 - 4B_{12}B_{34}B_{13}B_{24}$, $c = 2[B_{12}(B_{13}B_{23} + B_{14}B_{24}) + B_{34}(B_{13}B_{14} + B_{23}B_{24})]$, $p = [B_{23}B_{24}B_{34} - (B_{23}^2 + B_{24}^2 + B_{34}^2)]$, $q = [(B_{13} + B_{14} + B_{34} - (B_{13}^2 + B_{14}^2 + B_{34}^2)]$, $m = [B_{12}B_{14}B_{24} - (B_{12}^2 + B_{14}^2 + B_{24}^2)]$ and $n = [B_{12}B_{13}B_{23} - (B_{12}^2 + B_{13}^2 + B_{23}^2)]$, and a WGDOP closed form corresponding to the simplified WGDOP is obtained as $$S\_WGDOP = \sqrt{\frac{2 \cdot \left[\frac{1}{k_1} \cdot (4+p) + \frac{1}{k_2} \cdot (4+q) + \frac{1}{k_3} \cdot (4+m) + \frac{1}{k_4} \cdot (4+n)\right]}{a + c - 16 + 2 \cdot [(4+p) + (4+q) + (4+m) + (4+n)]}}.$$

If parameters can be rewritten as P=4+p, Q=4+q, M=4+m and N=4+n, another WGDOP closed form is obtained as $$S\_WGDOP = \sqrt{\frac{2 \cdot \left(\frac{1}{k_1} \cdot P + \frac{1}{k_2} \cdot Q + \frac{1}{k_3} \cdot M + \frac{1}{k_4} \cdot N\right)}{a + c - 16 + 2 \cdot (P + Q + M + N)}},$$

accordingly.

In the embodiment of the invention, the computer system 10 utilizes the central processing unit 100 to process the programming codes corresponding to the positioning process 20 and the simplification process 30 for obtaining the WGDOP closed form. Accordingly, the simplified WGDOP closed form can also be stored in the storage device 104. Preferably, the computer system 10 in the embodiment can continuously process an update operation for simplifying the WGDOP closed form within a predetermined period to cooperate with the continuously moving mobile device, i.e. the mobile device is not fixed and will continuously search for the appropriate base station to process the positioning operation as well as the wireless transmission process. Noticeably, the WGDOP is obtained from a combination of the GDOP and the weighted matrix, and certainly, those skilled in the art can simultaneously store the programming codes corresponding to the WGDOP of the embodiment and the GDOP of the prior art, such that both programming codes can be integrated for positioning the mobile device or either one of the programming codes can be adaptively selected by the user according to practical requirements in order to provide more accurate positioning efficiency as well as shorter calculating periods, which is also in the scope of the invention. Accordingly, the embodiment of the invention selects the four selected base stations BS1-BS4 from the plurality of base stations BS1-BSn in the wireless communication system 12 to position the mobile device MD, and those skilled in the art can adaptively select a particular number of the selected base stations for positioning according to different requirements, which is not limiting the scope of the invention.

For example, if the user wants to select four base stations as a base station set from the N number of base stations to position the mobile device MD, the calculation of $C_4^N$ becomes more complex when the N number of the base stations is larger, which means that the computer system 10 requires longer calculating periods as well as more hardware resources for processing the programming codes of the positioning process 20 as well as the simplification process 30. Thus, by processing the WGDOP closed form of the embodiment, it can effectively reduce the complex calculation of the computer system 10 or the stored programming code therein to correspondingly improve the application range of the computer system 10.

Noticeably, when the computer system 10 detects that the wireless communication system 12 is in the three-dimensional coordinate system and the plurality of covariances corresponding to the plurality of base stations are different, the embodiment of the invention renders the WGDOP closed form to comprise 45 multiplication computations, 49 addition computations, a division computation and a square root computation. When the computer system 10 detects that the wireless communication system 12 is in the two-dimensional coordinate system and the plurality of covariances corresponding to the plurality of base stations are different, the embodiment of the invention renders the WGDOP closed form to comprise 39 multiplication computations, 43 addition computations, a division computation and a square root computation. In other words, the WGDOP closed form of the embodiment only comprises four fundamental computations of arithmetic (i.e. the addition, the subtraction, the multiplication and the division), and the calculating burden of the computer system 10 can be efficiently reduced in comparison with the prior art of the GDOP, which utilizes a much more complicated inverse matrix calculation.

From a different perspective, the above descriptions can be summarized as a positioning method for a wireless communication system comprising a mobile device and a plurality of base stations (i=1-n). The method comprises the following steps. A multiplied geometric matrix M is obtained according to a plurality of relative distances between the mobile device and the plurality of base stations. A plurality of parameters are obtained as P=4+p, Q=4+q, M=4+m, N=4+n, a and c. The parameters P, Q, M and N are individually divided by a plurality of diagonal elements k1-k4 of the multiplied geometric matrix, to correspondingly sum results of the division and then multiply by two, so as to form a numerator value. A first sum of the parameters P, Q, M and N are multiplied by two to obtain a product, the parameters a and c are added to the product to obtain a second sum, and 16 is subtracted from the second sum to form a denominator value. The numerator value is divided by the denominator value and a square root operation is processed to obtain a weighted geometric dilution of precision (WGDOP) closed form as $$S\_WGDOP = \sqrt{\frac{2 \cdot \left(\frac{1}{k_1} \cdot P + \frac{1}{k_2} \cdot Q + \frac{1}{k_3} \cdot M + \frac{1}{k_4} \cdot N\right)}{a + c - 16 + 2 \cdot (P + Q + M + N)}}.$$

Lastly, the mobile device is positioned according to the WGDOP closed form.

Moreover, when one of the plurality of base stations is a serving base station (such as the base station BS1), a covariance of the serving base station corresponds to a first value, and covariances of other base stations of the plurality of base stations (such as the base stations BS2-BSn) correspond to a second value, which means that there are only two covariances while obtaining the relative distances $r_i$ of the base stations BS1-BSn. Under such circumstances, when the computer system 10 detects that the wireless communication system 12 is in the three-dimensional coordinate system, the embodiment of the invention renders the WGDOP closed form to comprise 42 multiplication computations, 45 addition computations, a division computation and a square root computation. When the computer system 10 detects that the wireless communication system 12 is in the two-dimensional coordinate system, the embodiment of the invention renders the WGDOP closed form to comprise 36 multiplication computations, 39 addition computations, a division computation and a square root computation. In other words, the WGDOP closed form of the embodiment only comprises four fundamental computations of arithmetic (i.e. the addition, the subtraction, the multiplication and the division), and the calculating burden of the computer system 10 can be efficiently reduced.

Moreover, the computer system 10, the positioning process 20 and the simplification process 30 of the embodiment can be utilized or cooperated with other algorithms or related hardware devices to be applied to a global positioning system (GPS), a wireless sensor network (WSN) or a femtocell, which is not limiting the scope of the invention. Additionally, the mentioned positioning process 20 and the simplification process 30 can be realized via different embodiments. In one embodiment, a non-transitory computer readable recording medium is utilized for instructing a processor (i.e. a central processing unit) to process the positioning process 20 and the simplification process 30 shown in FIG. 2 and FIG. 3. Also, the non-transitory computer readable recording medium can be in the form of ROM, flash memory, floppy disk, hard disk, CD, USB, magnetic tape, a database accessible by the network or any other similar storage medium familiar with those skilled in the art. In other embodiments, the positioning process 20 and the simplification process 30 shown in FIG. 2 and FIG. 3 can also be realized in a form of a computer programming product, which can be functionally operated once a computer has installed the computer programming product to process the plurality of instructions, so as to process the positioning process 20 and the simplification process 30 as mentioned. Preferably, the computer programming product can be stored inside a non-transitory computer readable recording medium or transmitted via the network, which is also in the scope of the invention.

In summary, the embodiments of the invention provide a method and a computer system to obtain a weighted geometric dilution of precision (WGDOP) closed form, so as to simplify a calculating process of the WGDOP for positioning a mobile device. As can be seen, the WGDOP of the embodiments of the invention only comprises the four fundamental computations of arithmetic (i.e. the addition, the subtraction, the multiplication and the division). In comparison with the prior art processing the complicated inverse matrix calculation, the embodiments of the invention has efficiently reduced the calculating burden/complexity of the computer system, and programming codes corresponding to the WGDOP as well as the GDOP can be adaptively switched by the user according to different requirements, which means that the embodiments of the invention can be utilized in the conditions as the continuously moving mobile device or the fixed mobile device. A great number of the base stations can also be inputted into the computer system of the embodiments of the invention without complicated inverse matrix calculation for positioning the mobile device, which can significantly improve the application range of the method and the computer system rendered in the embodiments of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system comprising:
 a central processing unit;
 a detection module coupled to the central processing unit for detecting a plurality of base stations (i=1–n) neighboring the computer system; and
 a storage device coupled to the central processing unit for storing a programming code, and the programming code is utilized to instruct the central processing unit to process a method for a wireless communication system comprising a mobile device and the plurality of base stations, the method comprising:
 obtaining a geometric matrix as $$H = \begin{bmatrix} e_{11} & e_{12} & e_{13} & 1 \\ e_{21} & e_{22} & e_{23} & 1 \\ \vdots & \vdots & \vdots & \vdots \\ e_{n1} & e_{n2} & e_{n3} & 1 \end{bmatrix}$$

according to a plurality of relative distances between the mobile device and the plurality of base stations, wherein $$e_{i1} = \frac{\hat{x} - X_i}{\hat{r}_i}, e_{i2} = \frac{\hat{y} - Y_i}{\hat{r}_i}, e_{i3} = \frac{\hat{z} - Z_i}{\hat{r}_i}, (X_i, Y_i, Z_i)$$

represents a position coordinate of the $i_{th}$ base station, $(\hat{x},\hat{y},\hat{z})$ is utilized as a simplified position coordinate, and $e_{i1}^2+e_{i2}^2+e_{i3}^2=1$ is satisfied;
 obtaining a weighted matrix as $$W = \begin{bmatrix} 1/\sigma_1^2 & 0 & 0 & 0 & 0 \\ 0 & 1/\sigma_2^2 & 0 & 0 & 0 \\ 0 & 0 & 1/\sigma_3^2 & 0 & 0 \\ 0 & 0 & 0 & \ddots & 0 \\ 0 & 0 & 0 & 0 & 1/\sigma_n^2 \end{bmatrix} = \begin{bmatrix} k_1 & 0 & 0 & 0 & 0 \\ 0 & k_2 & 0 & 0 & 0 \\ 0 & 0 & k_3 & 0 & 0 \\ 0 & 0 & 0 & \ddots & 0 \\ 0 & 0 & 0 & 0 & k_n \end{bmatrix}$$

according to the mobile device and the plurality of base stations, wherein $\sigma_i$ represents a covariance related to a corresponding one of the plurality of base stations, and $k_i$ represents a reciprocal value of each corresponding covariance;
 obtaining a weighted geometric dilution of precision (WGDOP) as WGDOP=$\sqrt{\text{tr}(H^T WH)^{-1}}$ according to the weighted matrix and the geometric matrix, so as to obtain a WGDOP closed form; and
 choosing a plurality of selected base stations from the plurality of base stations according to the WGDOP closed form, so as to position the mobile device.

2. The computer system of claim 1, wherein a number of the plurality of selected base stations is four.

3. The computer system of claim 2, wherein the step of obtaining the WGDOP according to the weighted matrix and the geometric matrix, so as to obtain the WGDOP closed form comprises:
 processing a transposition operation for the geometric matrix to obtain a transposed geometric matrix as $H^T$;
 sequentially processing a matrix multiplication as $$HH^T W = \begin{bmatrix} e_{11} & e_{12} & e_{13} & 1 \\ e_{21} & e_{22} & e_{23} & 1 \\ e_{31} & e_{32} & e_{33} & 1 \\ e_{41} & e_{42} & e_{43} & 1 \end{bmatrix} \begin{bmatrix} e_{11} & e_{21} & e_{31} & e_{41} \\ e_{12} & e_{22} & e_{32} & e_{42} \\ e_{13} & e_{23} & e_{33} & e_{43} \\ 1 & 1 & 1 & 1 \end{bmatrix} \begin{bmatrix} k_1 & 0 & 0 & 0 \\ 0 & k_2 & 0 & 0 \\ 0 & 0 & k_3 & 0 \\ 0 & 0 & 0 & k_4 \end{bmatrix}$$

for the geometric matrix, the transposed geometric matrix and the weighted matrix to obtain a multiplied geometric matrix as $$M = \begin{bmatrix} 2k_1 & k_2 B_{12} & k_3 B_{13} & k_4 B_{14} \\ k_1 B_{12} & 2k_2 & k_3 B_{23} & k_4 B_{24} \\ k_1 B_{13} & k_2 B_{23} & 2k_3 & k_4 B_{34} \\ k_1 B_{14} & k_2 B_{24} & k_3 B_{34} & 2k_4 \end{bmatrix},$$

wherein
 $B_{ij}=e_{i1}e_{j1}+e_{i2}e_{j2}+e_{i3}e_{j3}+1$, $1 \le i < j \le 4$ is satisfied; and
 obtaining a simplified WGDOP as S_WGDOP=$\sqrt{\text{tr}(M)^{-1}}$ according to the multiplied geometric matrix to obtain the WGDOP closed form corresponding to the WGDOP.

4. The computer system of claim 3, wherein the step of obtaining the simplified WGDOP according to the multiplied geometric matrix to obtain the WGDOP closed form corresponding to the WGDOP comprises:
 processing a trace multiplication operation for the multiplied geometric matrix to obtain an adjoint matrix of a plurality of multiplied geometric matrix elements on a principal diagonal of the multiplied geometric matrix and a determinant value of the multiplied geometric matrix, so as to process a deflation operation for obtaining the WGDOP closed form corresponding to the WGDOP;

wherein the trace multiplication operation is obtained as $$tr(M)^{-1} = \sum_{i=1}^{4} (M)_{i,i}^{-1} = \sum_{i=1}^{4} \frac{cof_{i,i}(M)}{\det(M)},$$

where $cof_{i,j}(M)$ represents the adjoint matrix of each of the plurality of multiplied geometric matrix elements, and det (M) is the determinant value of the multiplied geometric matrix.

5. The computer system of claim 4, wherein each of the plurality of multiplied geometric matrix elements is obtained as $cof_{1,1}(HH^TW)=k_2k_3k_4[8+2(B_{23}B_{24}B_{34}-(B_{23}^2+B_{24}^2+B_{34}^2))]$, $cof_{2,2}(HH^TW)=k_1k_3k_4[8+2(B_{13}B_{14}B_{34}-(B_{13}^2+B_{14}^2+B_{34}^2))]$, $cof_{3,3}(HH^TW)=k_1k_2k_4[8+2(B_{12}B_{14}B_{24}-(B_{12}^2+B+B_{14}^2+B_{24}^2))]$ and $cof_{4,4}(HH^TW)=k_1k_2k_3[8+2(B_{12}B_{13}B_{23}-(B_{12}^2+B_{13}^2+B_{23}^2))]$, and the determinant value of the multiplied geometric matrix is obtained as $$\det(HH^TW) =$$
$$k_1k_2k_3k_4\{16 + 2[B_{23}B_{24}B_{34} - (B_{23}^2 + B_{24}^2 + B_{34}^2)] + 2[B_{13}B_{14}B_{34} -$$
$$(B_{13}^2 + B_{14}^2 + B_{34}^2)] + 2[B_{12}B_{14}B_{24} - (B_{12}^2 + B_{14}^2 + B_{24}^2)] +$$
$$2[B_{12}B_{13}B_{23} - (B_{12}^2 + B_{13}^2 + B_{23}^2)] +$$
$$(B_{12}B_{34} + B_{13}B_{24} - B_{14}B_{23})^2 - 4B_{12}B_{34}B_{13}B_{24} +$$
$$2[B_{12}(B_{13}B_{23} + B_{14}B_{24}) + B_{34}(B_{13}B_{14} + B_{23}B_{24})]\}.$$

6. The computer system of claim 5, further comprising predetermining a plurality of parameters as $a=(B_{12}B_{34}+B_{13}B_{24}-B_{14}B_{23})^2-4B_{12}B_{34}B_{13}B_{24}$, $c=2[B_{12}(B_{13}B_{23}+B_{14}B_{24}+B_{34}(B_{13}B_{14}+B_{23}B_{24})]$, $p=[B_{23}B_{24}B_{34}-(B_{23}^2+B_{24}^2+B_{34}^2)]$, $q=[B_{13}B_{14}B_{34}-(B_{13}^2+B_{14}^2+B_{34}^2)]$, $m=[B_{12}B_{14}B_{24}-(B_{12}^2+B_{14}^2+B_{24}^2)]$ and $n=[B_{12}B_{13}B_{23}-(B_{12}^2+B_{13}^2+B_{23}^2)]$, and the simplified WGDOP corresponding to the WGDOP is obtained as $$S\_WGDOP = \sqrt{\frac{2 \cdot \left[\frac{1}{k_1} \cdot (4+p) + \frac{1}{k_2} \cdot (4+q) + \frac{1}{k_3} \cdot (4+m) + \frac{1}{k_4} \cdot (4+n)\right]}{a+c-16+2\cdot[(4+p)+(4+q)+(4+m)+(4+n)]}}.$$

7. The computer system of claim 6, further comprising predetermining a plurality of parameters as P=4+p Q=4+q M=4+m and N=4+n, and the simplified WGDOP is correspondingly obtained as $$S\_WGDOP = \sqrt{\frac{2 \cdot \left(\frac{1}{k_1} \cdot P + \frac{1}{k_2} \cdot Q + \frac{1}{k_3} \cdot M + \frac{1}{k_4} \cdot N\right)}{a+c-16+2\cdot(P+Q+M+N)}}.$$

8. The computer system of claim 7, wherein the wireless communication system is utilized in a three-dimensional coordinate system or a two-dimensional coordinate system.

9. The computer system of claim 8, wherein when the wireless communication system is utilized in the three-dimensional coordinate system and a plurality of covariances corresponding to the plurality of base stations are different, the WGDOP closed form comprises 45 multiplication computations, 49 addition computations, a division computation and a square root computation.

10. The computer system of claim 8, wherein when the wireless communication system is utilized in the two-dimensional coordinate system and a plurality of covariances corresponding to the plurality of base stations are different, the WGDOP closed form comprises 39 multiplication computations, 43 addition computations, a division computation and a square root computation.

11. The computer system of claim 8, wherein when one of the plurality of base stations is a serving base station, a covariance of the serving base station corresponds to a first value, and covariances of other base stations of the plurality of base stations correspond to a second value.

12. The computer system of claim 11, wherein when the wireless communication system is utilized in the three-dimensional coordinate system, the WGDOP closed form comprises 42 multiplication computations, 45 addition computations, a division computation and a square root computation.

13. The computer system of claim 11, wherein when the wireless communication system is utilized in the two-dimensional coordinate system, the WGDOP closed form comprises 36 multiplication computations, 39 addition computations, a division computation and a square root computation.

14. A computer system comprising:
a central processing unit;
a detection module coupled to the central processing unit for detecting a plurality of base stations (i=1–n) neighboring the computer system; and
a storage device coupled to the central processing unit for storing a programming code, and the programming code is utilized to instruct the central processing unit to process a method for a wireless communication system comprising a mobile device and the plurality of base stations, the method comprising:
obtaining a multiplied geometric matrix according to a plurality of relative distances between the mobile device and the plurality of base stations;
obtaining a plurality of parameters as P=4+p, Q=4+q, M=4+m, N=4+n, a and c;
individually dividing the parameters P, Q, M and N by a plurality of diagonal elements k1-k4 of the multiplied geometric matrix, to correspondingly sum results of the division and then multiply by two, so as to form a numerator value;
multiplying a first sum of the parameters P, Q, M and N by two to obtain a product, adding the parameters a and c to the product to obtain a second sum, and subtracting 16 from the second sum to form a denominator value;
dividing the numerator value by the denominator value and processing a square root operation to obtain a weighted geometric dilution of precision (WGDOP) closed form; and
positioning the mobile device according to the WGDOP closed form.

15. The computer system of claim 14, wherein the WGDOP closed form only comprises four fundamental computations of arithmetic, such that a plurality of selected base stations are selected from the plurality of base stations to position the mobile device.

16. The computer system of claim 15, wherein the step of obtaining the multiplied geometric matrix according to the plurality of relative distances between the mobile device and the plurality of base stations comprises:
sequentially processing a matrix multiplication operation for a geometric matrix H, a transposed geometric matrix $H^T$ and a weighted matrix W, to obtain the multiplied geometric matrix, wherein the geometric matrix is represented as $$H = \begin{bmatrix} e_{11} & e_{12} & e_{13} & 1 \\ e_{21} & e_{22} & e_{23} & 1 \\ \vdots & \vdots & \vdots & \vdots \\ e_{n1} & e_{n2} & e_{n3} & 1 \end{bmatrix},$$

the weighted matrix is represented as $$W = \begin{bmatrix} 1/\sigma_1^2 & 0 & 0 & 0 & 0 \\ 0 & 1/\sigma_2^2 & 0 & 0 & 0 \\ 0 & 0 & 1/\sigma_3^2 & 0 & 0 \\ 0 & 0 & 0 & \ddots & 0 \\ 0 & 0 & 0 & 0 & 1/\sigma_n^2 \end{bmatrix} = \begin{bmatrix} k_1 & 0 & 0 & 0 & 0 \\ 0 & k_2 & 0 & 0 & 0 \\ 0 & 0 & k_3 & 0 & 0 \\ 0 & 0 & 0 & \ddots & 0 \\ 0 & 0 & 0 & 0 & k_n \end{bmatrix}, \sigma_i$$

represents a covariance related to a corresponding one of the plurality of base stations, and $k_i$ represents a reciprocal value of each corresponding covariance.

17. The computer system of claim 16, wherein the multiplied geometric matrix is obtained as $$M = \begin{bmatrix} 2k_1 & k_2 B_{12} & k_3 B_{13} & k_4 B_{14} \\ k_1 B_{12} & 2k_2 & k_3 B_{23} & k_4 B_{24} \\ k_1 B_{13} & k_2 B_{23} & 2k_3 & k_4 B_{34} \\ k_1 B_{14} & k_2 B_{24} & k_3 B_{34} & 2k_4 \end{bmatrix}$$

and $B_{ij} = e_{i1}e_{j1} + e_{i2}e_{j2} + e_{i3}e_{j3} + 1$, $1 \leq i < j \leq 4$ is satisfied, and the plurality of parameters a, c, p, q, m and n are obtained as
$a = (B_{12}B_{34} + B_{13}B_{24} - B_{14}B_{23})^2 - 4B_{12}B_{34}B_{13}B_{24}$,
$c = 2[B_{12}(B_{13}B_{23} + B_{14}B_{24}) + B_{34}(B_{13}B_{14} + B_{23}B_{24})]$,
$p = [B_{23}B_{24}B_{34} - (B_{22}^2 + B_{24}^2 + B_{34}^2)]$,
$q = [B_{13}B_{14}B_{34} - (B_{13}^2 + B_{14}^2 + B_{34}^2)]$, $m = [B_{12}B_{14}B_{24} - (B_{12}^2 + B_{14}^2 + B_{24}^2)]$, and
$n = [B_{12}B_{13}B_{23} - (B_{12}^2 B_{13}^2 B_{23}^2)]$, respectively.

18. The computer system of claim 17, wherein the WGDOP closed form is obtained as $$S\_WGDOP = \sqrt{\frac{2 \cdot \left( \frac{1}{k_1} \cdot P + \frac{1}{k_2} \cdot Q + \frac{1}{k_3} \cdot M + \frac{1}{k_4} \cdot N \right)}{a + c - 16 + 2 \cdot (P + Q + M + N)}}.$$

* * * * *